US012726366B2

(12) United States Patent
Zamir et al.

(10) Patent No.: US 12,726,366 B2
(45) Date of Patent: Sep. 1, 2026

(54) END TO END SECURITY SYSTEM AND METHOD FOR IaaS IMPLEMENTATIONS

(71) Applicant: Dell Products L.P., Round Rock, TX (US)

(72) Inventors: Amos Zamir, Beer Sheva (IL); Shoham Levy, Pardes Hana—Karkur (IL); Michal Davidson, Beit Shemesh (IL)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 19/011,877

(22) Filed: Jan. 7, 2025

(65) Prior Publication Data

US 2026/0197185 A1 Jul. 9, 2026

(51) Int. Cl.

| | |
|---|---|
| ***H04L 29/06*** | (2006.01) |
| ***G06F 21/10*** | (2013.01) |
| ***H04L 9/30*** | (2006.01) |
| ***H04L 9/32*** | (2006.01) |

(52) U.S. Cl.

CPC ........ *H04L 9/3263* (2013.01); *G06F 21/1015* (2023.08); *H04L 9/3073* (2013.01)

(58) Field of Classification Search

None

See application file for complete search history.

(56) References Cited

U.S. PATENT DOCUMENTS

2022/0376929 A1* 11/2022 Nagaratnam ......... H04L 9/3234
2025/0055710 A1* 2/2025 Long ..................... H04L 9/3268
2026/0012353 A1* 1/2026 Elmenshawy ........ H04L 9/3247

FOREIGN PATENT DOCUMENTS

AU 2014274590 A1 * 1/2015

* cited by examiner

*Primary Examiner* — Andrew J Steinle

(74) *Attorney, Agent, or Firm* — Fogarty LLP

(57) ABSTRACT

Embodiments of systems and methods that may be used to protect customer configurations and policies for IaaS implementations. In an illustrative, non-limiting embodiment, a systems manager may receive user input for generating a configuration associated with an IaaS, send the configuration to a user of the IaaS. The user may then sign the configuration using a private key of a public/private key pair. The systems manager may then receive the signed configuration from the user, and distribute the signed configuration to each of a plurality of endpoints configured in the IaaS.

20 Claims, 6 Drawing Sheets

```
{
  signature_unique_id - generated by the signing server,
  valid from - the expiration date
  date - the expiration date
  key_id - the key identifier that should be used for the verification
  signing_algorithm - the signing schema to verify the signature
}
```

FIG. 4

END TO END SECURITY SYSTEM AND METHOD FOR IaaS IMPLEMENTATIONS

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Maintaining security across varying trust boundaries or domains over a communications network is an important facet of computing technology. A trust boundary may be referred to as a region within which a group of IHSs, their operations, and the data they use are trusted among one another. Typically, a trust boundary may be protected by computer security hardware and software such as firewalls, Virtual Private Networks (VPNs), intrusion detection and prevention systems, data leakage protections, antivirus programs, and the like. For an individual, a single laptop computer used in a person's home could comprise a trust boundary, while for an organization, a trust boundary may include an entire data center infrastructure, which may also include IHSs connected via VPNs.

Enterprises are increasingly making use of cloud driven computing models. For example, Infrastructure as a service (IaaS) includes an infrastructure distribution model in which a cloud provider hosts infrastructure components and makes them available to end users over a network, such as the Internet. IaaS is one of three main categories of cloud computing, alongside software as a service (SaaS) and platform as a service (PaaS). Such infra components may include storage endpoints, compute endpoints, and networking endpoints. Current trends in secure device identification and authentication has led to the use of digital certificates (e.g., X.509 certificates) and Public Key Infrastructure (PKI). Centralized identity management mechanisms, such as PKI, often uses a centralized trust anchor, a certificate authority (CA), for attesting to the validity of keying material.

SUMMARY

Embodiments of systems and methods that may be used to protect customer configurations and policies for IaaS implementations. In an illustrative, non-limiting embodiment, a systems manager may receive user input for generating a configuration associated with an IaaS, send the configuration to a user of the IaaS. The user may then sign the configuration using a private key of a public/private key pair. The systems manager may then receive the signed configuration from the user, and distribute the signed configuration to each of a plurality of endpoints configured in the IaaS.

According to another embodiment, an Infrastructure-as-a-Service (IaaS) end-to-end security method includes the steps of receiving user input for generating a configuration associated with an IaaS, sending the configuration to a user of the IaaS, receiving the signed configuration from the user, and distributing the signed configuration to each of a plurality of endpoints configured in the IaaS.

According to yet another embodiment, a computer program product includes a non-transitory computer readable storage medium with program instructions stored thereon that, upon execution by an Information Handling System (IHS), cause the IHS to receive user input for generating a configuration associated with an IaaS, send the configuration to a user of the IaaS, receive the signed configuration from the user, and distribute the signed configuration to each of a plurality of endpoints configured in the IaaS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 3 illustrates an example computing environment in which the IaaS end-to-end security system and method may be used to reclaim the remote client through a secure negotiation process without necessarily needing to restart the detailed claim process according to one embodiment of the present disclosure.

FIG. 4 illustrates an example metadata portion of the signed configuration that may be used with the IaaS end-to-end security system according to one embodiment of the present disclosure.

DETAILED DESCRIPTION

Figure 1A:
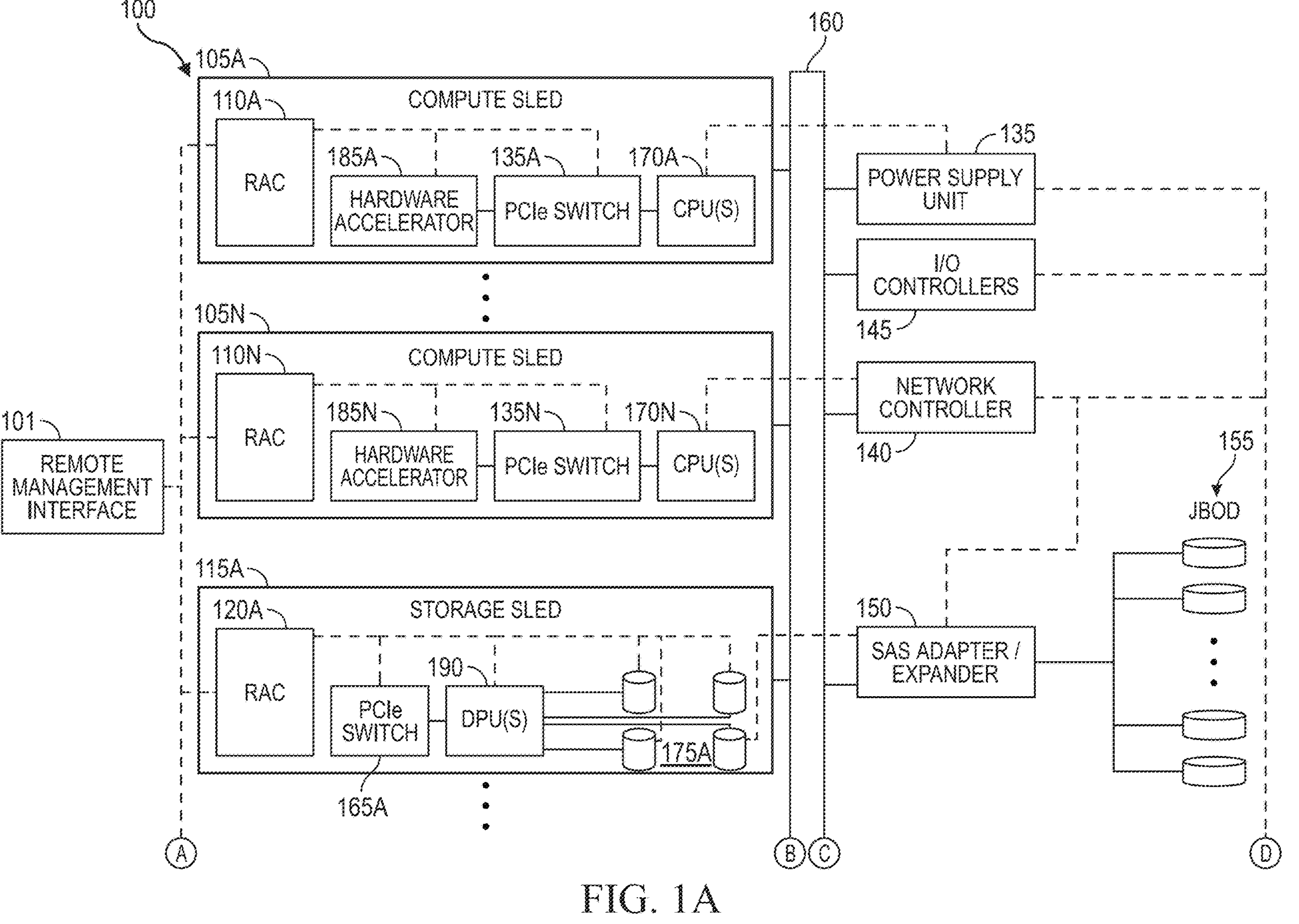
FIGS. 1A and 1B are block diagrams illustrating certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Infrastructure-as-a-service (IaaS) allows organizations to increase their region of interest (ROI) by providing infrastructure as a cloud service. Such a distributed architecture, however, may introduce certain security concerns. User ITDMs often need to provide configuration and policies that are stored and distributed by the infrastructure service. This configuration could be easily tampered with by malicious activity or insiders from the service provider. Therefore, additional controllers should be defined to ensure the authenticity of the customer's original intention. We suggest an end-to-end security solution for customer policies.

Traditional infrastructure was managed and configured completely by the customer's ITDM, resulting in a relatively large level of complexity and expertise that needed to be acquired. To reduce the complexity of managing data centers, cloud vendors have begun providing infrastructure as a service (IaaS) to let the customer focus on managing their business applications and data. However, the fact that the external vendor stored and managed critical business data was always a major concern for customers, and trust was assumed between the consumer and the provider.

In some use cases, edge devices are deployed at the customer site to reduce the latency of response and to provide intermediate processing before being processed by the cloud data center services. The concern for those edge devices is even bigger since the company's internal boundary is intertwined with the cloud vendor services both physically and logically. Each malicious manipulation of the deployment blueprint or configuration to an edge device could cause harm to the company. Therefore, it would be beneficial to have a process that ensures the consumer intention is not manipulated until it is consumed and processed by the edge devices.

Another use case is vendor orchestration. Today, many IaaS vendors provide services to automate processes such as data replication and movement system deployment, and day 2 life cycle management such as software upgrades and system expansion. Each device or service managed in the customer data center could be applied to a policy downstream from the centralized orchestration layer managed by the vendor. Thus, the customer initially configured the policy but it could be manipulated on its way to the device. As such, it would be beneficial to ensure that the policy is not manipulated and that it does not compromise the environment once it is defined by the customer security admin and applied at the end target.

As will be described in detail herein below, embodiments of the present disclosure provide a novel approach to protecting customer configurations and policies for IaaS implementations. We propose an end-to-end secure solution, secured by supporting customer signing of the policies and verifying the authenticity of the configuration at some, most, or all of the endpoints. This may ensure end-to-end verification, from customer declaration to execution, and prevents the intervention of a malicious third party, including protecting against malicious insiders within the service provider of the IaaS.

In the world of distributed systems, a management software implementation needs to manage remote end points (nodes/software/devices), which are located across the WAN network in any of the deployment scenario such as on-premises or multi-cloud, either standalone or as VM installations or a microservices cluster. These remote clients are typically first claimed through a cloud-based service (e.g., Dell APEX) secure process after end points are validated and managed through a secure channel. It is expected that the remote client will, from time to time, renew the CA signed certificate used to establish the secure channel (e.g., mutual TLS (mTLS)) before it expires.

Figure 1B:
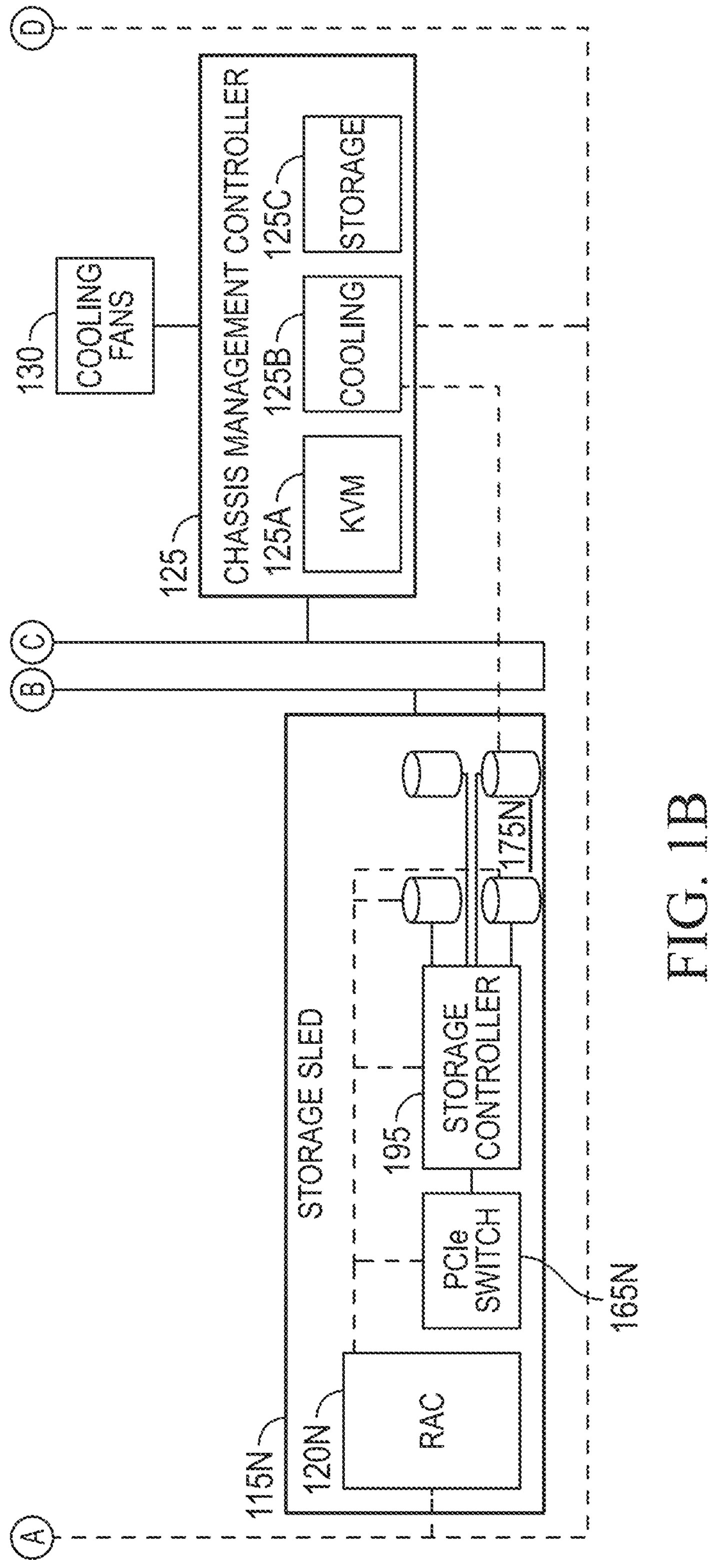

FIGS. 1A and 1B are block diagrams illustrating certain components of a chassis 100 comprising one or more compute sleds 105*a-n* and one or more storage sleds 115*a-n* that may be configured to implement the systems and methods described according to one embodiment of the present disclosure. Embodiments of chassis 100 may include a wide variety of hardware configurations in which one or more sleds 105*a-n*, 115*a-n* are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105*a-n*, 115*a-n* that are installed in the chassis. In addition, once the chassis 100 has been deployed, firmware used by individual hardware components of the sleds 105*a-n*, 115*a-n*, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105*a-n* and storage sleds 115*a-n*, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135*a-n*, 165*a-n* installed in the sleds 105*a-n*, 115*a-n* of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185*a-n* operate according to firmware instructions that may be occasionally updated, such as to adapt the capabilities of the respective hardware accelerators 185*a-n* to specific computing tasks.

Chassis 100 may be installed within a rack structure that provides at least a portion of the cooling utilized by the sleds 105*a-n*, 115*a-n* installed in chassis 100. In supporting airflow cooling, a rack may include one or more banks of cooling fans 130 that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans 130 to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105*a-n*, 115*a-n* to backplane 160 include PCIe couplings that support high-speed data links with the sleds 105*a-n*, 115*a-n*. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
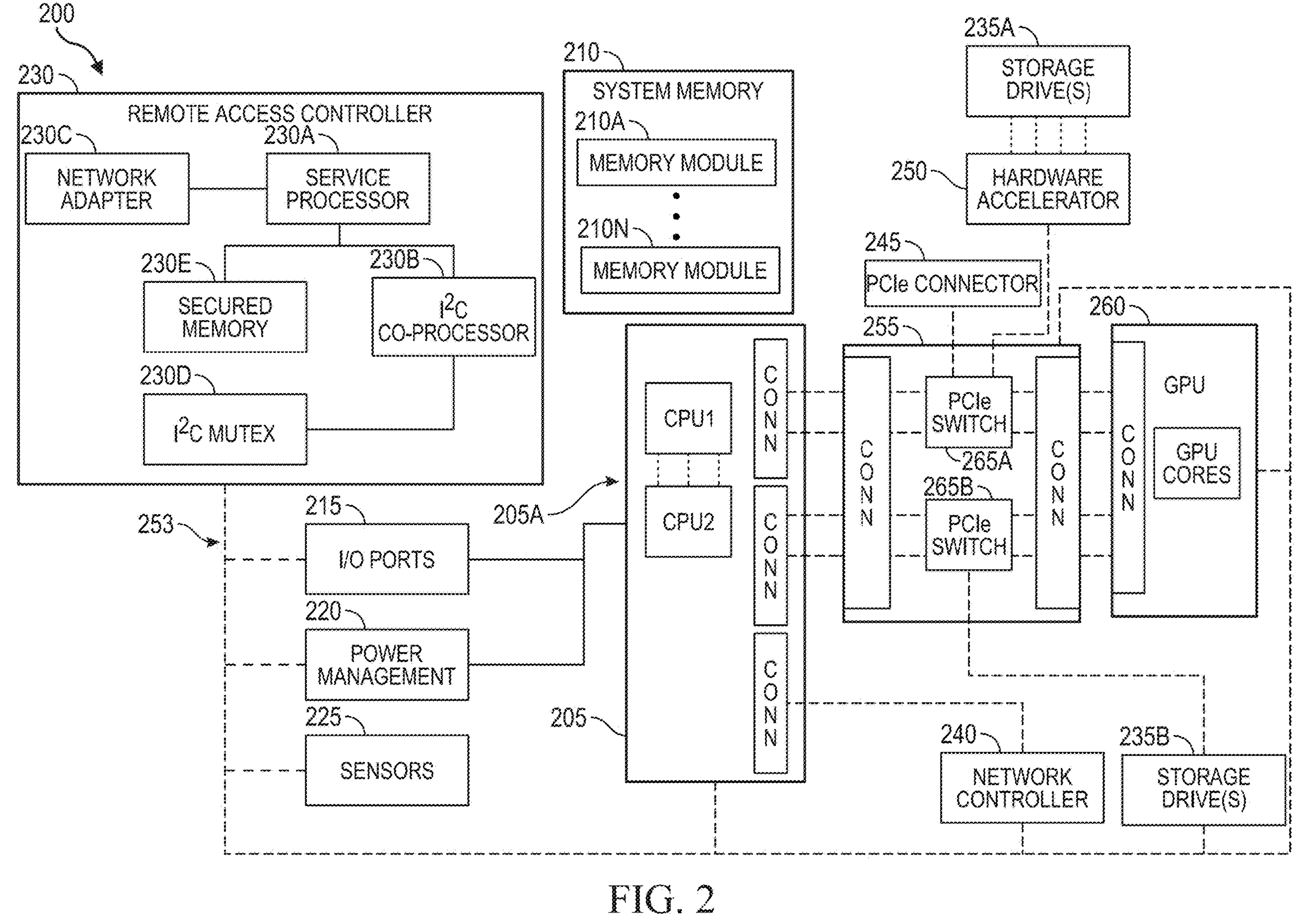
FIG. 2 illustrates an example of an IHS configured to implement systems and methods described herein according to one embodiment of the present disclosure.

In certain embodiments, each individual sled 105*a-n*, 115*a-n* may be an IHS such as described with regard to IHS 200 of FIG. 2. Sleds 105*a-n*, 115*a-n* may individually or collectively provide computational processing resources that may be used to support a variety of e-commerce, multimedia, business, and scientific computing applications, such as artificial intelligence systems provided via cloud computing implementations. Sleds 105*a-n*, 115*a-n* are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105*a-n*, 115*a-n* be likewise made without having to reboot the respective sled of the hardware component that is being updated.

As illustrated, each sled 105*a-n*, 115*a-n* includes a respective remote access controller (RAC) 110*a-n*, 120*a-n*. As described in additional detail with regard to FIG. 2, remote access controller 110*a-n*, 120*a-n* provides capabilities for remote monitoring and management of a respective sled 105*a-n*, 115*a-n* and/or of chassis 100. In support of these monitoring and management functions, remote access controllers 110*a-n* may utilize both in-band and sideband (i.e., out-of-band) communications with various managed components of a respective sled 105*a-n* and chassis 100. Remote access controllers 110*a-n*, 120*a-n* may collect diverse types of sensor data, such as collecting temperature sensor readings that are used in support of airflow cooling of the chassis 100 and the sled 105*a-n*, 115*a-n*. In addition, each remote access controller 110*a-n*, 120*a-n* may implement various monitoring and administrative functions related to a respective sled 105*a-n*, 115*a-n*, where these functions may be implemented using sideband bus connections with various internal components of the chassis 100 and of the respective sleds 105*a-n*, 115*a-n*. As described in additional detail below, in various embodiments, these capabilities of the remote access controllers 110*a-n*, 120*a-n* may be utilized in updating the firmware of hardware components of chassis 100 and/or of hardware components of the sleds 105*a-n*, 115*a-n*, without having to reboot the chassis or any of the sleds 105*a-n*, 115*a-n*.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175*a-n* installed in a chassis 100, or to all of the storage drives 175*a-n* of a particular model or manufacturer. In some instances, remote management interface 101 may include an inventory of the hardware, software, and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110*a-n*, 120*a-n*. In some embodiments, remote management interface 101 may communicate with remote access controllers 110*a-n*, 120*a-n* via a protocol such the Redfish remote management interface.

In the illustrated embodiment, chassis 100 includes one or more compute sleds 105*a-n* that are coupled to the backplane 160 and installed within one or more bays or slots of chassis 100. Each of the individual compute sleds 105*a-n* may be an IHS, such as described with regard to FIG. 2. Each of the individual compute sleds 105*a-n* may include various different numbers and types of processors that may be adapted to performing specific computing tasks. In the illustrated embodiment, each of the compute sleds 105*a-n* includes a PCIe switch 135*a-n* that provides access to a hardware accelerator 185*a-n*, such as the described DPUs, GPUs, Smart NICs and FPGAs, which may be programmed and adapted for specific computing tasks, such as to support machine learning or other artificial intelligence systems. As described in additional detail below, compute sleds 105*a-n* may include a variety of hardware components, such as hardware accelerator 185*a-n* and PCIe switches 135*a-n*, that operate using firmware that may be occasionally updated.

As illustrated, chassis 100 includes one or more storage sleds 115*a-n* that are coupled to the backplane 160 and installed within one or more bays of chassis 100 in a similar manner to compute sleds 105*a-n*. Each of the individual storage sleds 115*a-n* may include various different numbers and types of storage devices. As described in additional detail with regard to FIG. 2, a storage sled 115*a-n* may be an IHS 200 that includes multiple solid-state drives (SSDs) 175*a-n*, where the individual storage drives 175*a-n* may be accessed through a PCIe switch 165*a-n* of the respective storage sled 115*a-n*.

As illustrated, a storage sled 115*a* may include one or more DPUs (Data Processing Units) 190 that provide access to and manage the operations of the storage drives 175*a* of the storage sled 115*a*. Use of a DPU 190 in this manner provides low-latency and high-bandwidth access to numerous SSDs 175*a*. These SSDs 175*a* may be utilized in parallel through NVMe transmissions that are supported by the PCIe switch 165*a* that connects the SSDs 175*a* to the DPU 190. In some instances, PCIe switch 165*a* may be an integrated component of a DPU 190. The immense data storage and retrieval capabilities provided by such storage sled 115*a* implementations may be harnessed by offloading storage operations directed as storage drives 175*a* to a DPU 190*a*, and thus without relying on the main CPU of the storage sled, or of any other component of chassis 100. As indicated in FIG. 1, chassis 100 may also include one or more storage sleds 115*n* that provide access to storage drives 175*n* via a storage controller 195. In some embodiments, storage controller 195 may provide support for RAID (Redundant Array of Independent Disks) configurations of logical and physical storage drives, such as storage drives provided by storage sled 115*n*. In some embodiments, storage controller 195 may be a HBA (Host Bus Adapter) that provides more limited capabilities in accessing storage drives 175*n*.

In addition to the data storage capabilities provided by storage sleds 115*a-n*, chassis 100 may provide access to other storage resources that may be installed components of chassis 100 and/or may be installed elsewhere within a rack that houses the chassis 100. In certain scenarios, such storage resources (e.g., JBOD 155) may be accessed via a SAS expander 150 that is coupled to the backplane 160 of the chassis 100. The SAS expander 150 may support connections to a number of JBOD (Just a Bunch of Disks) storage resources 155 that, in some instances, may be configured and managed individually and without implementing data redundancy across the various drives. The additional JBOD storage resources 155 may also be at various other locations within a datacenter in which chassis 100 is installed.

In light of the various manners in which storage drives 175*a-n*, 155 may be coupled to chassis 100, a wide variety of different storage topologies may be supported. Through these supported topologies, storage drives 175*a-n*, 155 may be logically organized into clusters or other groupings that may be collectively tasked and managed. In some instances, a chassis 100 may include numerous storage drives 175*a-n*, 155 that are identical, or nearly identical, such as arrays of SSDs of the same manufacturer and model. Accordingly, any firmware updates to storage drives 175*a-n*, 155 requires the updates to be applied within each of these topologies being supported by the chassis 100. Despite the large number of different storage drive topologies that may be supported by an individual chassis 100, the firmware used by each of these storage devices 175*a-n*, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105*a-n*, 115*a-n* installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a-n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105*a-n*, 115*a-n* or other type of server, such as a 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205*a*. The system memory 210 is coupled to CPUs 205 via one or more memory buses 205*a* that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. Each of the PCIe switches 265*a-b* may operate according to firmware instructions that may be occasionally updated.

Using the available PCIe lanes, the PCIe switches 265*a-b* may be used to implement a PCIe switch fabric. Also through this switch fabric, PCIe NVMe (Non-Volatile Memory Express) transmission may be supported and utilized in high-speed communications with SSDs, such as storage drives 235*a-b*, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated.

As illustrated, PCIe switch 265*a* is coupled via a PCIe link to a hardware accelerator 250, such as a DPU, SmartNIC, GPU and/or FPGA, that may be connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., ×86) cores. Hardware accelerator may operate according to firmware instructions that may be occasionally updated.

In the illustrated embodiment, the programmable capabilities of hardware accelerator 250 implement functions used to support storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support of high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the CPUs 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230*a*, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230*e* for exclusive use by the remote access controller in support of management operations.

In some embodiments, remote access controller 230 may implement monitoring and management operations using MCTP (Management Component Transport Protocol) messages that may be communicated to managed devices 205, 235*a*-*b*, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265*a*-*b*. In some instances, the sideband management connections supported by remote access controller 230 may include PLDM (Platform Level Data Model) management communications with the managed devices 205, 235*a*-*b*, 240, 250, 255, 260 of IHS 200.

As illustrated, remote access controller 230 may include a network adapter 230*c* that provides the remote access controller with network access that is separate from the network controller 240 utilized by other hardware components of the IHS 200. Through secure connections supported by network adapter 230*c*, remote access controller 230 communicates management information with remote management interface 101. In support of remote monitoring functions, network adapter 230*c* may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235*a*-*b*, 240, 250, 255, 260 of the IHS 200 through the operation of an I2C multiplexer 230*d* of the remote access controller. As illustrated in FIG. 2, the managed devices 205, 235*a*-*b*, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230*a* of remote access controller 230 may rely on an I2C co-processor 230*b* to implement sideband I2C communications between the remote access controller 230 and the managed hardware components 205, 235*a*-*b*, 240, 250, 255, 260 of the IHS 200. The I2C co-processor 230*b* may be a specialized co-processor or micro-controller that is configured to implement an I2C bus interface used to support communications with managed hardware components 205, 235*a*-*b*, 240, 250, 255, 260 of IHS. In some embodiments, the I2C co-processor 230*b* may be an integrated circuit on the same die as the service processor 230*a*, such as a peripheral system-on-chip feature that may be provided by the service processor 230*a*. The I2C sideband bus 253 is illustrated as single line in FIG. 2. However, sideband bus 253 may be comprised of multiple signaling pathways, where each may be comprised of a clock line and data line that couple the remote access controller 230 to I2C endpoints 205, 235*a*-*b*, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
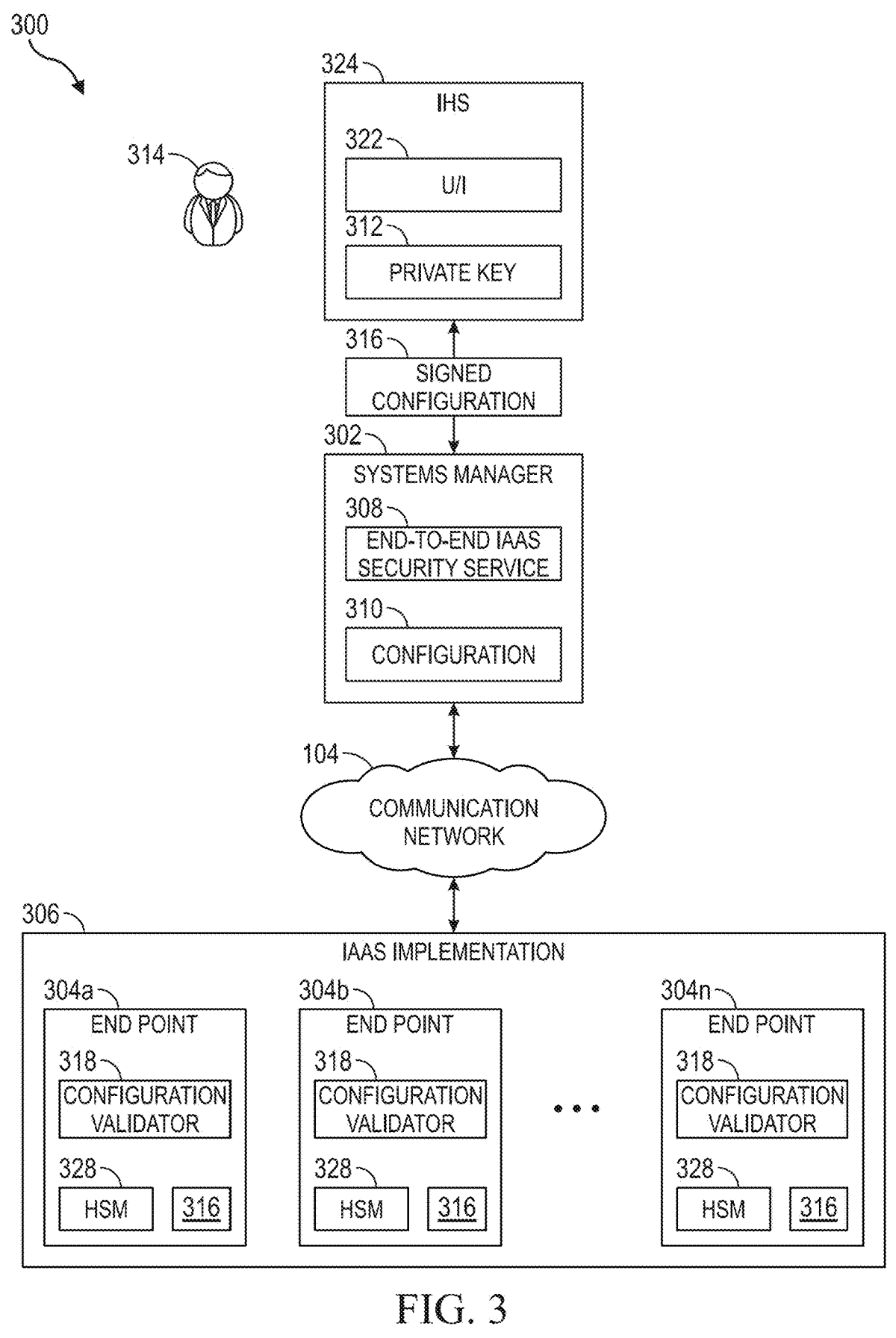

FIG. 3 illustrates an example IaaS end-to-end security system 300 that may be used to protect customer configurations and policies for IaaS implementations according to one embodiment of the present disclosure. The IaaS end-to-end security system 300 includes a systems manager 302 that is used to manage the operation of multiple endpoints 304*a*-*n* (collectively 304) configured in an IaaS implementation 306. According to embodiments of the present disclosure, the IaaS end-to-end security system 300 includes an end-to-end IaaS security service 308 that is used to generate a configuration 310 that includes information associated with the IaaS implementation 306. The generated configuration 310 may then be signed by a private key 312 known only by a user 314 of the IaaS implementation 306 to create a signed configuration 316 that may be distributed, by the IaaS end-to-end security service 308, to each of the endpoints 304 in the IaaS implementation 306. Thereafter, whenever a configuration change is attempted on an endpoint 304, a configuration validator 318 may verify the authenticity of the configuration prior to allowing the configuration change on that endpoint 304 using a public key associated with the private key 312.

In general, the configuration 310 is a file or other type of data structure that stores information associated with the configuration of the endpoints 304 in the IaaS implementation 306. Such information may include, for example, one or more blueprints indicating how the endpoints 304 are connected with one another, configuration parameters (IP addresses of the endpoints 304, ports used by each endpoint 304, personal information, etc.), and/or security policies for each endpoint 304. For example, the configuration 310 may be populated with a number of tuples that associates a particular parameter with its accepted value.

In one embodiment, the configuration 310 may include parameters that are associated with a certain portion of the endpoints 304 in the IaaS implementation 306 using an audience field. For example, a certain number of endpoints 304 that are used by an accounting department of an organization may be configured with policies that differ from those used by the development personnel in the organization. As such, the configuration 310 may be structured such that those policies associated with the endpoints 304 used by the accounting department are enforced only to the endpoints 304 used by the accounting department.

For the purposes of this disclosure, the systems manager 302 may refer broadly to any system that is configured to issue management instructions to the endpoints 304 of the IaaS implementation 306. One example of such a systems manager 302 is the Dell OpenManage Enterprise (OME) systems management console. In various embodiments, the systems manager 302 may be implemented via specialized hardware and/or via software running on a standard information handling system. In one embodiment, the systems manager 302 may be deployed on a secure virtual machine (VM), such as a VMWARE Workstation appliance.

The IaaS end-to-end security service 308 may communicate with a user interface 322 of an IHS 324 used by the user 314 to receive parameters and/or policies for generating the configuration 310. Here, the user, for example, may be an IT Decision Maker (ITDM) or administrator of the IaaS implementation 306 who is responsible for configuring the IaaS implementation 306 for use. Because the private key 312 is known only to the user 314, only the user 314 can generate a valid signed configuration 316. Even the vendor who provides the IaaS implementation 306 for the user 314 is not allowed to generate a valid signed configuration 316. Thus, the IaaS end-to-end security system 300 may provide a secure end-to-end secure IaaS implementation 306 where trust is limited to users 314 of the IaaS implementation 306.

The IaaS end-to-end security service 308 may also communicate with the IHS 324 to receive from, and distribute the signed configuration 316 to each of the endpoints 304 in the IaaS implementation 306. As shown, each endpoint 304 includes a Hardware Security Module (HSM) 328 that may be used by the configuration validator 318 to validate the authenticity of the signed configuration 316 stored in its respective endpoint 304. In other embodiments, other types of authentication techniques may be used. For example, the configuration validator 318 may use cloud native techniques, such as an external Certificate Authority (CA) to authenticate the validity of the signed configuration 316.

The endpoints 304 may each be any suitable type. In the Infrastructure as a Service (IaaS) model, there can be different types of resources, namely physical resources and virtual resources. The physical resources may be the hardware of the infrastructure on which the virtual resources are running. Virtual resources are resources provided as services built on top of the physical resources using virtualization facilities. Moreover, each endpoint 304 may be classified as a compute resource, a storage resource, or a network resource.

FIG. 4 illustrates an example metadata portion 400 of the signed configuration 316 that may be used with the IaaS end-to-end security system 300 according to one embodiment of the present disclosure. The IaaS end-to-end security method 400 includes several parameters that may be included in the metadata of the signed configuration 316. The parameters include a signature_unique_id parameter that is generated by the signing server, a valid from date parameter, an expiration date parameter, a key_id parameter that identifies the public key that should be used for the verification, and a signing_algorithm parameter indicating the signing schema used to verify the signature.

The metadata portion 400 may be used to enhance security provided by the signed configuration 316. For example, a security breach could occur with old, signed configurations 316 that have been superseded by a newer signed configuration 316, yet would still pass authentication as a valid authentication. Therefore, to mitigate this threat, the configuration validator 318 may include executable code to compare the key_id parameter against the most currently issued public key to ensure that the latest signed configuration 316 is being used. Additionally, the configuration validator 318 may include executable code to compare the expiration date parameter against the current date to determine whether the signed configuration 316 has expired. In either case, when the signed configuration 316 has been determined to be superseded or expired, steps may be taken to distribute a new, valid signed configuration 316 to the endpoint 304.

Figure 5:
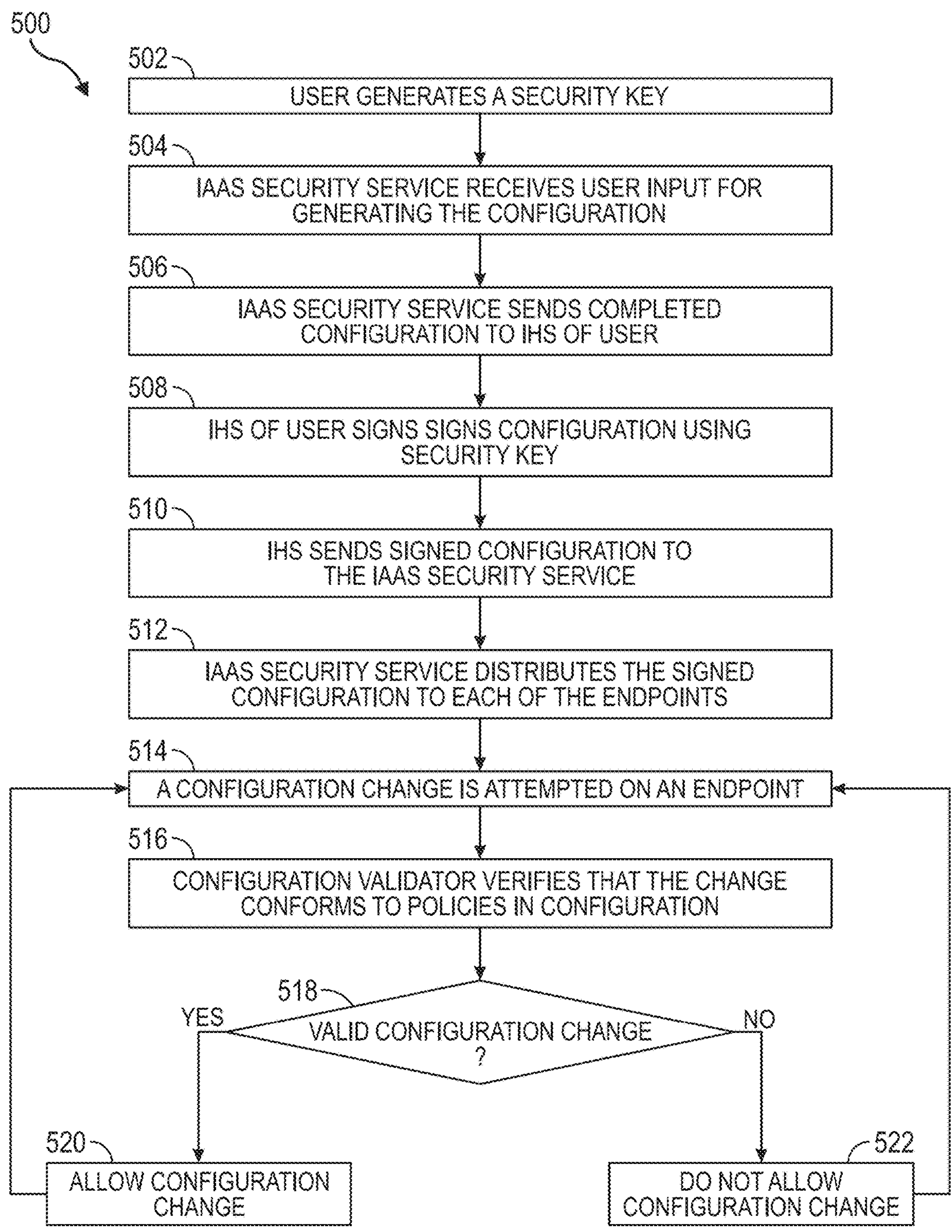
FIG. 5 illustrates an example IaaS end-to-end security method according to one embodiment of the present disclosure.

FIG. 5 illustrates an example IaaS end-to-end security method 500 according to one embodiment of the present disclosure. For example, the following steps describe a process of reclaiming/trusting the remote cloud computing client, when the cloud computing client fails to renew the secure credentials with the time window as described above. In one embodiment, the method 500 may be performed in whole, or in part, by the IaaS end-to-end security system 300 as described herein above. The IaaS end-to-end security method 500 may be performed when a configuration for the IaaS implementation 306 is generated for the first time, or whenever a currently existing configuration is changed. Initially, a number of endpoints (resources) are allocated for use by an IaaS vendor and made available to a user (e.g., customer).

In general, steps 502-512 describe acts that may be performed for establishing a new configuration 316 or making a change to an existing configuration 316 for an IaaS implementation 306. At step 502, the user 314 generates a security key. In one embodiment, the user 314 may generate an asymmetric key pair comprising a private key that is known only to the user, and a public key that is to be distributed to each endpoint 304 in the IaaS implementation 306. At step 504, the IaaS end-to-end security service 308 receives user input for generating the configuration 310. In one embodiment, the configuration may include parameters with an audience field such that certain policies may be enforced on a limited number of endpoints 304 in the IaaS implementation 306. When the configuration 310 is completed, the IaaS end-to-end security service 308 sends it to the IHS 324 of the user 314 at step 506.

At step 508, the IHS 324 of the user 314 signs the configuration 310 using the private key previously generated at step 502, and at step 510, sends the signed configuration 316 to the IaaS end-to-end security service 308. The IaaS end-to-end security service 308, at step 512, distributes the signed configuration 316 to each of the endpoints 304 that have been allocated to the user.

Steps 514-522 generally describe acts that may be performed each time a configuration change is attempted on any one of the endpoints 304. At step 514, a configuration change is attempted on an endpoint 304. Thereafter at step 516, the configuration validator 318 verifies that the configuration change conforms to one or more policies in the signed configuration. For example, the configuration validator 318 may verify the authenticity of the signed configuration using a HSM 328 configured in the endpoint 304 or using a cloud native technique (e.g., cloud-based CA). Once the authenticity of the signed configuration 316 is verified, the configuration validator 318 may verify that the configuration change is allowed by the signed configuration 316.

At step 518, the configuration validator 318 determines whether the attempted configuration change is valid. If so, processing continues at step 520 in which the configuration change is allowed; otherwise, processing continues at step 522 in which the configuration change is inhibited. After either of steps 520 or 522 have been performed, processing continues at step 514 to validate other attempted configuration changes to the endpoint 304.

Although FIG. 5 describes an example method 500 that may be performed to provide end-to-end security for the endpoints 304 in an IaaS implementation 306, the features of the disclosed processes may be embodied in other specific forms without deviating from the spirit and scope of the present disclosure. For example, certain steps of the disclosed method 500 may be performed sequentially, or alternatively, they may be performed concurrently. As another example, the method 500 may perform additional, fewer, or different operations than those operations as described in the present example.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Infrastructure-as-a-Service (IaaS) end-to-end security system comprising:

a systems manager comprising at least one processor, and at least one memory coupled to the at least one processor, the at least one memory having program instructions stored thereon that, upon execution by the processor, cause the systems manager to:

receive user input for generating a configuration associated with an IaaS;

send the configuration to a user of the IaaS, wherein the user signs the configuration using a private key of a public/private key pair;

receive the signed configuration from the user; and distribute the signed configuration to each of a plurality of endpoints configured in the IaaS.

2. The IaaS end-to-end security system of claim 1, wherein each of the endpoints is configured to, when a configuration change is attempted:

verify the authenticity of the signed configuration using a public key associated with the public/private key pair; and verify that the configuration change conforms to one or more policies in the signed configuration.

3. The IaaS end-to-end security system of claim 2, wherein each of the endpoints is configured to verify the authenticity of the signed configuration using a Hardware Security Module (HSM) configured in the endpoint.

4. The IaaS end-to-end security system of claim 2, wherein each of the endpoints is configured to verify the authenticity of the signed configuration using an external third party Certificate Authority (CA).

5. The IaaS end-to-end security system of claim 2, wherein the instructions, upon execution, cause the systems manager to sign at least one parameter in the configuration using the public key of at least one endpoint, wherein at least one of the endpoints is configured to verify the authenticity of the at least one parameter using its private key.

6. The IaaS end-to-end security system of claim 2, wherein each of the endpoints is configured to verify an expiration date of the signed configuration.

7. The IaaS end-to-end security system of claim 1, wherein the instructions, upon execution, cause the systems manager to, whenever a change is made to the configuration, perform the acts of receiving user input, sending the configuration to the user, receiving the signed configuration, and distributing the signed configuration to each endpoint again.

8. The IaaS end-to-end security system of claim 1, wherein the configuration is configured to store information associated with at least one of a blueprint indicating how the endpoints are connected with one another, a configuration parameter, an IP address of the endpoint, one or more ports used by each endpoint, personal information, or one or more security policies for each endpoint.

9. An Infrastructure-as-a-Service (IaaS) end-to-end security method comprising:

receiving user input for generating a configuration associated with an IaaS;

sending the configuration to a user of the IaaS, wherein the user signs the configuration using a private key of a public/private key pair;

receiving the signed configuration from the user; and distributing the signed configuration to each of a plurality of endpoints configured in the IaaS.

10. The IaaS end-to-end security method of claim 9, further comprising, when a configuration change is attempted:

verifying the authenticity of the signed configuration using a public key associated with the public/private key pair; and verifying that the configuration change conforms to one or more policies in the signed configuration.

11. The IaaS end-to-end security method of claim 10, further comprising verifying the authenticity of the signed configuration using at least one of a Hardware Security Module (HSM) configured in the endpoint or an external third party Certificate Authority (CA).

12. The IaaS end-to-end security method of claim 10, further comprising signing at least one parameter in the configuration using the public key of at least one endpoint, wherein at least one of the endpoints is configured to verify the authenticity of the at least one parameter using its private key.

13. The IaaS end-to-end security method of claim 10, further comprising verifying an expiration date of the signed configuration.

14. The IaaS end-to-end security method of claim 9, further comprising, whenever a change is made to the configuration, performing the acts of receiving user input, sending the configuration to the user, receiving the signed configuration, and distributing the signed configuration to each endpoint again.

15. A computer program product comprising a non-transitory computer readable storage medium having program instructions stored thereon that, upon execution by an Information Handling System (IHS), cause the IHS to:

receive user input for generating a configuration associated with an IaaS;

send the configuration to a user of the IaaS, wherein the user signs the configuration using a private key of a public/private key pair;

receive the signed configuration from the user; and distribute the signed configuration to each of a plurality of endpoints configured in the IaaS.

16. The computer program product of claim 15, wherein each of the endpoints is configured to, when a configuration change is attempted:

verify the authenticity of the signed configuration using a public key associated with the public/private key pair; and verify that the configuration change conforms to one or more policies in the signed configuration.

17. The computer program product of claim 16, wherein each of the endpoints is configured to verify the authenticity of the signed configuration using at least one of a Hardware Security Module (HSM) configured in the endpoint or an external third party Certificate Authority (CA).

18. The computer program product of claim 16, wherein the instructions, upon execution, cause the systems manager to sign at least one parameter in the configuration using the public key of at least one endpoint, wherein at least one of the endpoints is configured to verify the authenticity of the at least one parameter using its private key.

19. The computer program product of claim 16, wherein each of the endpoints is configured to verify an expiration date of the signed configuration.

20. The computer program product of claim 15, wherein the instructions, upon execution, cause the systems manager to, whenever a change is made to the configuration, perform the acts of receiving user input, sending the configuration to the user, receiving the signed configuration, and distributing the signed configuration to each endpoint again.

* * * * *